March 9, 1943.  E. D. LILJA  2,313,079
CONDITION CONTROL
Filed June 28, 1940  2 Sheets-Sheet 1

INVENTOR
Edgar D. Lilja
BY Parker, Carlson, Pitzner, Hubbard
ATTORNEYS

March 9, 1943.  E. D. LILJA  2,313,079
CONDITION CONTROL
Filed June 28, 1940  2 Sheets-Sheet 2

INVENTOR
Edgar D. Lilja
BY
ATTORNEYS

Patented Mar. 9, 1943

2,313,079

UNITED STATES PATENT OFFICE 2,313,079

CONDITION CONTROL

Edgar D. Lilja, Rockford, Ill., assignor to Barber-Colman Company, Rockford, Ill., a corporation of Illinois Application June 28, 1940, Serial No. 342,954

20 Claims. (Cl. 236—78)

This invention relates generally to systems for automatically controlling a condition regulating device such as a switch, a valve, a voltage regulator, a speed controller, etc., in response to mechanical, electrical, or chemical condition changes to be maintained at a uniform value. More particularly, the invention relates to controls of the so-called resetting-proportioning type in which a primary response or movement by the regulating device occurs in proportion to the degree of deviation of the controlled condition from the value desired to be maintained and is followed by a slow secondary response or resetting action that causes sufficient further correcting movement of the regulating device to effect complete restoration of the controlled condition to the desired value.

One object of the invention is to provide a control system of the above character in which the resetting action is produced by an electric actuator the operating speed of which is varied at a rate proportional to the degree of deviation of the controlled condition from the desired value.

Another object is to provide novel mechanism for controlling the primary and secondary responses in a system of the above general character.

The invention also resides in the novel character of the means by which the resetting action is varied automatically.

Figure 1:
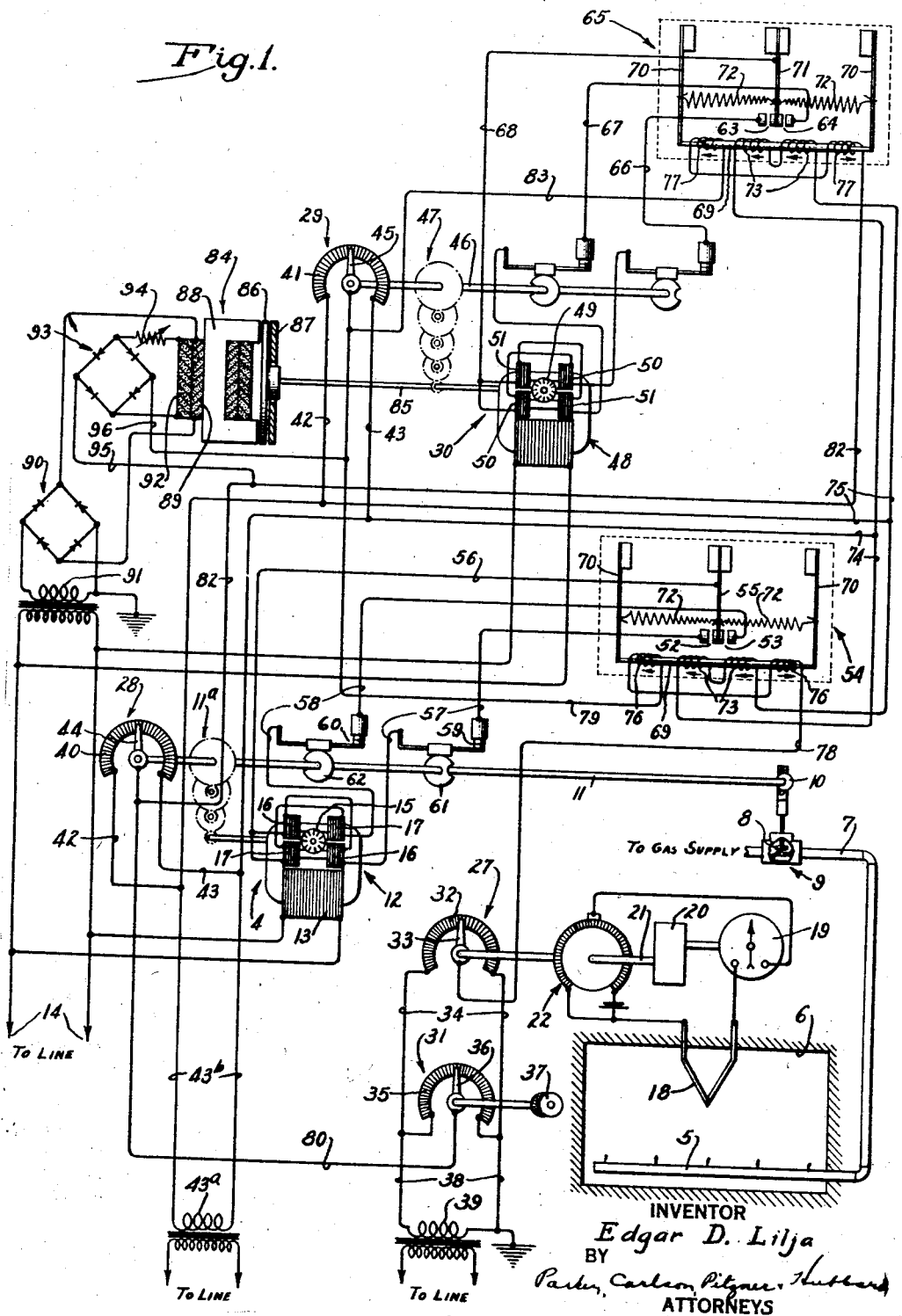
Figure 2:
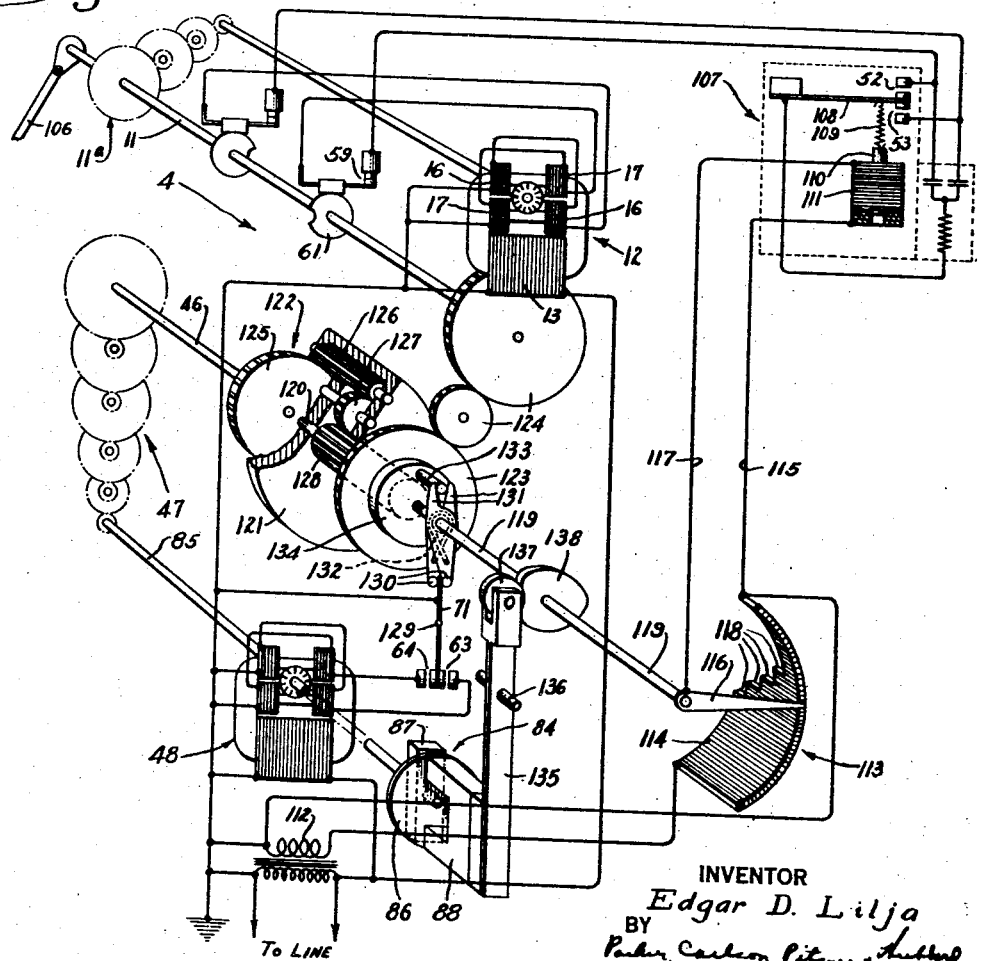

Other objects and advantages of the invention will become apparent from the following detailed description taken in connection with the accompanying drawings, in which Figures 1 and 2 are schematic views and wiring diagrams illustrating different types of controls embodying the present invention.

Figure 3:
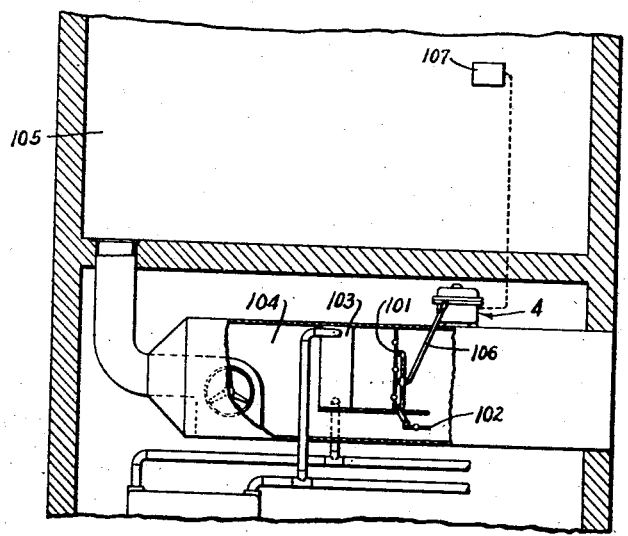

Fig. 3 is an elevational view partially in section of a conditioning apparatus adapted to be regulated by the control of Fig. 2.

While the invention is susceptible of various modifications and alternative constructions and of application to the control of various kinds of regulating devices for maintaining a wide variety of conditions, it has been shown in the drawings and will be described herein as applied to the control of a typical temperature changer. It will be understood that I do not intend to limit the invention by such exemplary disclosure but aim to cover all modifications, alternative constructions, and uses falling within the spirit and scope of the invention as expressed in the appended claims.

Referring first to Fig. 1, the temperature changer shown therein is a burner 5 adapted to heat an oven chamber 6 and utilize fuel such as gas the supply of which is delivered through a pipe 7 and modulated in accordance with changes in the position of the regulating member 8 of a valve 9 actuated by an electric operator 4. Herein, the degree of valve opening and therefore the capacity of the heater is varied by a cam 10 on a shaft 11 which is oscillated varying distances back and forth with a graduated movement by a reversible electric motor 12 operating through speed reduction gearing 11$^a$ to drive the operating shaft.

Preferably, the motor 12 is of the shaded pole induction type having a winding 13 constantly energized from a voltage source 14 of alternating current and a rotor 15 arranged to turn clockwise and counter-clockwise respectively according to which of two sets of shading coils 16 and 17 is short-circuited, the rotor remaining idle when both sets are open-circuited.

The means herein shown for detecting deviations of the controlled condition, that is, the oven temperature, from the value desired to be maintained includes a thermo-couple 18 that energizes a galvanometer 19 which in turn controls a motor-driven clutch 20 to cause movement of a shaft 21 in the direction of a temperature change. The shaft carries the movable element of a potentiometer 22 which operates in a manner well known in the art to balance the thermo-couple potential after a shaft movement corresponding to the temperature change. As a result, the angular position of the shaft changes with and in proportion to the oven temperature.

The movements of the shaft 21 may be utilized in various ways to reposition the regulating device or valve and produce the primary and secondary responses above referred to. In the present instance, this is effected electrically by an arrangement of bridge circuits controlled by a transmitting potentiometer 27 operated from the shaft 21, a balancing potentiometer 28 actuated in unison with the valve member 8, a potentiometer 29 actuated by an electric motor operator 30 and controlling the secondary response, and a fourth potentiometer 31 which is adjustable manually.

Herein, the potentiometer 27 comprises a stationary resistance 32 divided by a movable terminal or slider arm 33 fast on the shaft 21 so as to turn counter-clockwise in response to a call for heat and clockwise as the oven temperature rises above the desired value. To form one of the bridges, opposite ends of the resistance 32 are connected by conductors 34 to the terminals of the stationary resistance element 35 of the adjusting potentiometer 31. This element is divided by an arm 36 that may be turned by a knob 37 to vary the relative resistance values of the end portions and thereby enable the maintained oven temperature to be changed as desired. Conductors 38 connect the ends of the bridge to an alternating current source 39.

The potentiometers 28 and 29 are connected to form a second bridge circuit. For this purpose, the terminals of their resistances 40 and 41 are connected by conductors 42 and 43. The bridge is energized from an alternating current source 43ª connected by conductors 43ᵇ to the conductors 42 and 43. The resistance 40 is divided by a slider arm 44 fast on the shaft 11 so as to move in unison with the regulating valve member 8. The resistance 41 is divided by a slider 45 fast on a shaft 46 which is driven through speed reduction gearing 47 from a reversible motor 48 of the operator 30, the rotor 49 of which turns in opposite directions in response to selective short-circuiting of shading coils 50 and 51. To limit the rate of the secondary response or restoring action, a greater reduction is effected through the gearing 47 than through the gearing 11ª so that the shaft 46 is turned by its motor at a substantially slower speed than the shaft 11, for example, about one-tenth of the speed of the latter shaft.

Short-circuiting of the shading coils 16 and 17 is controlled by switches 52 and 53 of a sensitive relay 54 having a tongue 55 connected by a conductor 56 to the common terminal of the shading coils. The other coil terminals are connected to the stationary contacts of the switches 52 and 53 through conductors 57 and 58 having interposed therein normally closed switches 59 and 60 opened by cams 61 and 62 on the shaft 11 in the limit open and closed positions of the valve. Thus, when there is a call for heat, closure of the switch 52 will short-circuit the coils 16 and the motor 12 will run in a direction to turn the shaft 11 counter-clockwise and open the valve. Reverse movement occurs while the switch 53 is closed.

In a similar way, switches 63 and 64 of a relay 65 have a common contact tongue 71 and are connected by conductors 66 and 67 and a common conductor 68 to the shading coils 50 and 51. The motor 48 thus operates to turn the shaft 46 counter-clockwise when the switch 63 is closed and clockwise while the switch 64 remains closed.

Preferably the relays 54 and 65 are of the polarized type and of the same construction. Each comprises a horizontal armature bar 69 supported for frictionless endwise movement by two flexible strips 70 which are suspended on a suitable base also supporting the tongue 55 or 71. Light contractile springs 72 transmit the armature movement to the tongue. The armature is suspended within an iron-clad solenoid, containing two pairs of windings, with one winding of each pair in the left half of the solenoid casing and the other winding of the pair in the right half of the casing. The exciting windings 73 of both relays are excited continuously by alternating current from source 43ª. For this purpose, conductors 43ᵇ are joined to conductors 74 and 75, leading to the terminals of each set of coils 73. When the exciting windings alone are energized, they exert equal and opposite forces on the armature and it remains suspended in the center of the solenoid. The switch tongue is then disposed midway between the stationary contacts, both switches being open.

The control windings 76 and 77 of the relay comprise the second of the above-mentioned pairs of coils and are wound in opposite directions within the left and right halves of the solenoids. A current flow through the control windings of one of the relays thus produces a magnetic field which opposes that of the exciting winding in one-half of the solenoid and adds to it in the other half, producing a resulting force that shifts the armature away from the weakened field and toward the strengthened field. Thus, currents flowing in windings 73 and 76 induce fluxes in the directions indicated by the arrows in Fig. 1, causing the tongue 55 to move in a direction to close switch 52. An unbalanced condition of the relay is caused by a small voltage impressed on the control winding, the direction of unbalance depending on the phase relation between this voltage and that impressed on the exciting winding. Consequently, the relay is well suited for accurate and directional response to unbalance in the bridge circuits.

To position the valve member 8 in accordance with the primary and secondary responses and with the selected adjustment of the potentiometer 31, the control windings 76 of the relay 54 are arranged to respond to the resultant of the potentials at all the sliders 33, 36, 44, and 45. For this purpose, opposite terminals of the windings 76 are connected by conductors 78 and 79 to the sliders 33 and 45 of the potentiometers 27 and 29 and the sliders 36 and 44 are joined by a conductor 80. As a result of this arrangement, the bridge balance is upset, for example, by counter-clockwise movement of the slider 33 in response to a fall in oven temperature below the selected value. The voltage then impressed on the relay windings 76 will be directly proportional to the displacement of the slider 33 relative to the slider 36. Also, the direction of current flow through the windings 76 will produce magnetic fluxes directed as indicated by the arrows thereby closing the relay switch 52 which energizes the motor 12 to initiate opening of the valve 9. As an incident to this, the slider 45 of the potentiometer 29 is turned counter-clockwise until the resulting voltage change between the sliders 44 and 45 is just equal and opposite to that between the sliders 33 and 36. The balance of the circuits is thus restored so that the relay windings 76 will be deenergized and the motor 12 stopped after a movement of the valve member closely proportional to the decrease in oven temperature below normal. Reverse movement of the relay tongue and the sliders 33 and 44 occurs in response to a rise in temperature as a result of which the motor 12 is operated and the valve closed in proportion to the temperature increase. The changes in the position of the valve, which are thus produced immediately with temperature deviations and are proportioned in magnitude according to such deviations constitute the primary response of the control system.

The secondary response or resetting action above referred to causes movement of the regulating device beyond the position corresponding to a condition deviation and thereby compensates for the shift of the condition control point due to the proportioning action. This secondary response is controlled by the relay 65, the control windings 77 of which are connected to the slider 44 by a conductor 82 and to the slider 45 by a conductor 83. They are thus energized in response to displacement of these sliders relative to each other. Whenever the balance of this bridge is upset, as, for example, by the counter-clockwise movement of the slider 44 that occurs with a decrease in oven temperature, a voltage is impressed on the windings 77 causing fluxes to be induced in the relay armature as indicated by the arrows. The switch 63 is thus closed causing operation of the motor 48 in a direction to turn the slider 45 counter-clockwise and thereby reduce the voltage across the windings 77. This reduction occurs slowly at a rate determined by the gearing 47 and the change in the position of the slider 45, although restoring the balance in the one bridge, further upsets the balance in two bridges controlling the windings 76 of the relay 54 with the result that the switch 52 is again closed and the motor 12 again operated until the balance of relay 54 is reestablished by further movement of the balancing slider 44. As an incident to this, the valve 9 is further opened which is reflected in an increase in the oven temperature. Since the balancing potentiometer 28 is operated faster than the restoring potentiometer 29, the balance of the relay 54 is restored periodically so that the movement of the regulating device by which the desired temperature is restored takes place in successive steps. The average rate of repositioning the valve to produce the secondary response or restoring action is approximately equal to the speed of the shaft 46.

When the oven temperature has returned to normal as a result of the secondary response above referred to, the balance of the bridge circuit controlling the relay 65 and the two controlling the relay 54 will have been reestablished and both motors 12 and 48 will stop. The system remains in this condition until the oven temperature deviates from the selected value. If the temperature rises above the selected value, the slider 33 and all of the other parts will move in the directions reverse to those above described and the secondary response or resetting action will occur in the opposite manner. The ultimate effect of the control as a whole is to adjust the heating capacity of the burner 5 very accurately and without objectionable hunting so as to maintain a predetermined oven temperature.

As an inherent incident to the proportioning action or primary response above referred to, the effective control point of the control system changes in proportion to the condition deviation, such change corresponding to the initial movement of the valve member and being compensated for by the secondary response that is governed by the rheostat 29. In accordance with the present invention, a suitable adjustable speed controller is provided for governing the speed of the resetting control motor 48 so that the rate of the resetting action is increased in proportion to the control point shift or the magnitude of each condition deviation. In this way, the delay incident to effecting full restoration of the desired condition value is reduced to a minimum while preserving the desired anti-hunting characteristics of the control and insuring the maintenance of closer condition regulation.

Such control of the motor may be effected accurately without variation due to friction by means of an eddy current brake 84 that exerts a retarding action that is varied inversely proportional to the control point shift of the condition responsive instrument. As shown herein, the brake comprises an inductor in the form of a copper disk 86 fast on the shaft 85 between a magnetic plate 87 and a C-shaped core 88. In the form of the invention shown in Fig. 1, the retarding effect is controlled electrically and for this purpose the core carries a winding 89 excited by a rectifier 90 constantly excited from an alternating current source 91. A second or control winding 92 connected in magnetic opposition to the first derives excitation from a rectifier 93 whose output circuit includes a rheostat 94. The angular spacing of the sliders 44 and 45 at any time corresponds to the extent of control point shift. Accordingly, the degree of energization of the relay 65, which is a measure of the control point shift, is utilized to vary the energization of the winding 92.

For this purpose, the input terminals of the rectifier 93 are connected by conductors 95 and 96 to the conductors 82 and 79 so that the rectifier is in parallel with operating winding 77 of the resetting control relay 65. The circuit design is such that the magnetic effect of the winding 92 never exceeds that of the winding 89.

Under a condition of balance of the bridge circuits, that is, when the oven temperature is at the desired value, the winding 92 will be deenergized and the effect of the brake will be a maximum due to the winding 89. Now, when there is a sudden large change in the oven temperature and the motor 12 produces a correspondingly large movement of the slider 44, the voltage delivered by the bridge to the rectifier 93 will be correspondingly high and the excitation of the brake will be reduced accordingly. As a result, the resetting motor 48 will run at a comparatively high speed initially. As the control point of the system is restored by the potentiometer 29, the voltage delivered to the rectifier 93 falls and the core 88 becomes more strongly excited thereby reducing the speed of the motor 48. In this way, the rate of the resetting action is varied automatically and corresponds in magnitude to the degree of the deviation.

It will be observed that the action of the speed controller is independent of the direction of the resetting action. This is due to the use of the rectifier 93 which passes current to the control winding 92 in one direction only. Adjustment of the variable speed characteristic, that is, the relation between the control point shift and the resetting speed, may be effected by manipulation of the rheostat 94.

Figs. 2 and 3 show a modification in which the resetting action is regulated in a somewhat different way. To simplify the description, the parts in common between this system and that shown in Fig. 1 are designated by the same reference numerals.

The regulating device comprises the face and by-pass dampers 101 and 102 for a heater 103 of a system for heating air forced through a duct 104 to a room 105 in which a controlling thermostat 107 is located. Motion is imparted to the dampers by a link 106 actuated by a crank on the shaft 11 of the electric operator 4 whose motor winding 13 is constantly energized from an A. C. source 112.

The common contact of the thermostat switches 52 and 53 which control the motor windings 16 and 17 is carried by a bimetallic strip 108. A light contractile spring 109 is stretched between the free end of this strip and a plunger armature 110 of a solenoid 111, the degree of energization of which determines the effective control point of the thermostat. Energization of the solenoid is controlled by a potentiometer 113 which, in the present instance, is actuated in accordance with the combined movements of the main and resetting motors 12 and 48 to correspondingly vary the control point of the thermostat and produce the primary response or proportioning action as well as to cause the secondary response.

The resistance element 114 of the potentiometer is connected across the power source 112 and a conductor 115 connects one of its terminals to the solenoid which is connected by a conductor 117 to a slider 116 that wipes across one edge of the resistance coil 114. The opposite edge of the coil is stepped as indicated at 118 to obtain a non-linear resistance gradient that matches approximately the current-pull characteristics of the solenoid.

The slider 116 is fast on a shaft 119 which is pressed at 120 into a rotatable housing 121 which constitutes the intermediate or driven member of a spur gear differential 122. A gear 123 driven from the operator shaft 11 through gears 124 forms one terminal of the differential which is thus turned in unison with the movements of the regulating device or dampers 101 and 102. The other terminal or driving member comprises a gear 125 fast on the shaft 46 of the resetting operator and meshing with a gear 126 journaled in the housing 121. This gear meshes with an idler gear 127 which in turn meshes with gear teeth on the hub 128 of the gear 123. By virtue of this differential drive, the slider 116 will respond to operation of the motors 12 and 48 singly or in combination as a result of which the potentiometer 113 performs the functions of the two potentiometers 28 and 29 in the system first described.

To produce the resetting action, the switches 63 and 64 are closed in response to opposite movements of the driven differential member away from the balance position at which the desired room temperature obtains. For this purpose, the yieldable tongue 71 carrying the common switch contact is pivoted at 129 with its remote end disposed between the ends 130 of arms 131 which are loose on the shaft 119 and urged together by spring 132. The other ends of the arms bear against opposite sides of a pin 133 projecting from a disk 134 which is fast on the shaft 119. Thus, as the shaft turns in either direction away from the neutral position shown, one of the switches 63 and 64 will be closed and the motor 48 will run in the corresponding direction.

The operation of the system is the same as the system described above. Briefly, any movements of the motor 12 in response to closure of either of the thermostat switches will result in a repositioning of the slider 116 through the differential drive until the energization of the solenoid 111 has been changed sufficiently to open the thermostat switch. The primary response or proportioning action is thus obtained. Such movement of the shaft 119 causes one of the switches 63 and 64 to be closed and operation of the motor 48 in a direction to return the slider 116 to mid-position. The resetting movement of the slider is thus produced through the other terminal of the differential.

As in the system first described, an eddy current brake 84 is employed to control the speed of the motor 48 and vary the rate at which the resetting action occurs automatically according to the degree that the controlled condition deviates from the selected value. The brake comprises a copper disk 86 fast on the motor shaft 85 between the plate 87 and the C-shaped field member 88 which in this instance is composed of permanent magnetic material and is mounted for movement parallel to the disk so that the reluctance of the flux circuit and therefore the retarding effect may be varied mechanically. This is accomplished herein by mounting the member 88 on the lower end of an arm 135 pivoted at 136 and having a roller 137 on its upper end that constitutes the follower of a cam 138 fast on the shaft 119. The cam is heart-shaped and thus operates to shift the member 88 in response to movement of the shaft in either direction away from the balanced position shown in Fig. 2. In this position of the parts, the faces of the magnetic members 87 and 88 are in register so that the flux through the disk 86 and therefore the retarding effect exerted thereon is a maximum. The motor 48 thus runs at minimum speed. If the shaft 119 turns in either direction from the mid-position shown, as it will in response to a condition deviation, the member 88 is correspondingly shifted to the right increasing the air gap between it and the member 87. The flux through the brake disk is reduced accordingly, causing the resetting motor 48 to run faster.

Other means than the brake may, of course, be employed to control the rate of the resetting action. For example, the movable arm 135 may be arranged to actuate a rheostat in series with the field winding of the motor 48 in a manner such as to produce the desired variations in the motor speed.

The eddy current braking means and the manner of its application provides for effective control over the rate of resetting and enables this rate to be graduated accurately in proportion to the shift of the control point of the condition responsive instrument. The speed control may be governed electrically (Fig. 1) or mechanically (Fig. 2) and does not involve frictional forces that would influence the nicety of the regulation.

I claim as my invention:

1. A condition control system having, in combination, a first bridge circuit and a second bridge circuit, a reversible power operator having a driven member controlling the balance of both of said bridge circuits, said operator being responsive to an unbalance of said first circuit and operating said member in a direction to correct such unbalance and to unbalance the second bridge, a second slower acting reversible electric operator controlling the balance of said second bridge circuit and adapted to be energized to a predetermined degree, a relay controlled according to the unbalance of said second circuit and governing the operation of said second operator in a direction to further unbalance the circuit controlling said first operator and thereby cause a secondary response in the positioning of said member by said first operator, means for varying the balance of one of said circuits with changes of the condition to be regulated; an electromagnetic speed controller operable to govern the speed of said second operator while the energization of the operator remains constant, and means acting automatically to cause energization of said controller in accordance with the energization of said relay.

2. A condition control system having, in combination, a bridge circuit having a pair of movable elements governing the bridge balance, a reversible power operator having a driven member and actuating one of said elements, said operator being responsive to an unbalance of said circuit and operating one of said elements to rebalance the circuit, a second slower acting operator having a reversible electric motor energized to a predetermined degree in response to movement of said one element and operable to actuate the other of said elements to further unbalance said circuit and produce a secondary resetting response in the positioning of said member by said first operator, and a controller having a winding variably energized independently of said motor and in proportion to the degree of unbalance of said bridge circuit and governing the speed of said motor in accordance with the degree of energization of said winding.

3. A condition control system having, in combination, a reversible power operator having a driven member, means including an alternating current bridge circuit controlling said operator to proportion the movements of said member in accordance with deviations in a controlled condition from a desired value, means operating in the movement of said member following a condition deviation to restore the balance of said circuit, a second slower acting operator having a reversible electric motor responsive to unbalance of said circuit and operable in a direction to increase the degree of unbalance and cause a secondary response in the positioning of said member by said first operator, an electromagnetic controller governing the speed of said motor and having a winding, and a rectifier having an output circuit including said winding and an input circuit energized from said bridge circuit.

4. A condition control system having, in combination, a reversible power operator, a driven member actuated by said operator, means controlled by deviations of a condition from a desired value and governing the operation of said operator to modulate the position of said member in proportion to each condition deviation, a second operator having a reversible electric motor and a driven element movable slower than said member, means responsive to opposite changes in the relative positions of said member and element for causing operation of said motor in a corresponding direction, an eddy current brake acting on said motor, and means for energizing said brake varying degrees in accordance with the degree of deviation of said member and element and independently of the direction of such change.

5. A condition control system having, in combination, a reversible power operator, a driven member actuated by said operator, means controlled by deviations of a condition from a desired value and governing the operation of said operator to modulate the position of said member in proportion to each condition deviation, a second operator having a reversible electric motor and a driven element movable slower than said member, means responsive to opposite changes in the relative positions of said member and element for causing operation of said motor in a corresponding direction, an electromagnetically actuated controller operable to vary the speed of said motor in proportion to its degree of energization and having two opposing windings, means constantly energizing one of said windings, and means energizing said other winding to a degree corresponding to the departure of said member and element from one another whereby to vary the motor speed proportional to the magnitude of such departure.

6. A control system having, in combination, a reversible electric motor operator having a driven member, means for detecting deviations of a controlled condition from a desired value, mechanism controlled by said means and controlling said operator to actuate said member first with a primary movement proportional and in a direction corresponding to the condition deviations and then with a slower secondary resetting movement, said mechanism including a reversely acting electrical device having motor means selectively energizable to determine the direction of said secondary movement and a second electrical device having a winding variably energized to control the speed of operation of the first device and therefore the rate of the secondary movement, and means operable to vary the energization of said winding automatically in accordance with the degree of deviation of the condition from said desired value.

7. A control system having, in combination, a reversible electric motor operator having a driven member, an instrument controlling said operator to cause opposite movements of said member in response to opposite deviations of a controlled condition from the instrument control point, a second reversible electric operator having an element driven at a slower speed than said member, a device driven differentially by said member and element and controlling the direction of operation of said second operator according to its position relative to a predetermined point, an eddy current brake controlling the speed of said second operator and having magnetic members movable relative to each other to vary the braking effect, and means actuated by said device for moving said magnetic members relative to each other to vary the braking effect in response to movement of said device in either direction away from said predetermined point.

8. A control system having, in combination, a reversible electric motor operator having a driven member, means for detecting deviations of a controlled condition from a desired value, mechanism controlled by said means and controlling said operator to actuate said member first with a primary movement proportional and in a direction corresponding to the condition deviations and then with a slower secondary resetting movement, said mechanism including a second operator having a reversible electric motor and an element driven thereby and determining the direction of said secondary movement, a speed controller for said motor, and mechanical means driven differentially by said member and element and operating selectively to adjust the speed setting of said controller.

9. A control system having, in combination, a reversible electric motor operator having a driven member, means for detecting deviations of a controlled condition from a desired value, mechanism controlled by said means and controlling said operator to actuate said member first with a primary movement proportional and in a direction corresponding to each condition deviation and then with a slower secondary resetting movement, said mechanism including a second operator driven by reversible electric motor driving means energizable to a predetermined degree and determining the direction of said secondary movement, and independently acting means controlling the speed of said driving means and operating automatically to vary such speed and the rate of said resetting movement in accordance with the degree of deviation of the condition from said desired value.

10. A condition control system having, in combination, a reversible power operator, a driven member actuated by said operator, means controlled by deviations of a condition from a desired value and governing the operation of said operator to modulate the position of said member in proportion to each condition deviation, a second operator having a reversible electric motor and a driven element movable slower than said member, means responsive to opposite changes in the relative positions of said member and element for causing operation of said motor in a corresponding direction, a selectively adjustable magnetic induction brake exerting a retarding effect on said motor, and means for adjusting said brake automatically in accordance with changes in the relative positions of said member and element.

11. A control system having, in combination, a reversible electric motor operator having a driven member, means for detecting deviations of a controlled condition from a desired value, mechanism controlled by said means and controlling said operator to actuate said member first with a primary movement proportional and in a direction corresponding to the condition deviations and then with a slower secondary resetting movement, said mechanism including a second operator driven by reversible electric motor driving means determining the direction and rate of said secondary movement, and an automatically controlled eddy current brake varying the speed of said driving means.

12. A control system having, in combination, a reversible electric motor operator having a driven member, means for detecting deviations of a controlled condition from a desired value, mechanism controlled by said means and controlling said operator to actuate said member first with a primary movement proportional and in a direction corresponding to the condition deviations and then with a slower secondary resetting movement, said mechanism including an electric motor operable to exert a predetermined torque for producing said resetting movement and an independently acting device determining the speed of operation of said motor without changing the magnitude of said torque, and automatic means controlling said device to modulate the rate of said resetting movement in proportion to the condition deviation prevailing.

13. A control system having, in combination, a reversible electric motor operator having a driven member, an instrument for detecting deviations of a controlled condition from a predetermined value, mechanism controlled by said instrument and controlling said operator to actuate said member and incidentally shifting the control point of said instrument correspondingly, means including a second operator driven by reversible electric motor driving means coacting with said mechanism to control said first operator and produce a slower secondary resetting movement of the member, braking means controlling the speed of said driving means, and means governing said braking means selectively to vary the braking effect with the shift of said instrument control point from said predetermined value.

14. A control system having, in combination, a reversible electric motor operator having a driven member, an instrument controlling said operator to cause opposite movements of said member in response to opposite deviations of a controlled condition from the instrument control point, a second reversible electric operator having an element driven at a slower speed than said member, differential gearing having terminal driving members respectively driven by said driven member and element and an intermediate member, means controlling said second operator to cause movements of said driven element in opposite directions when said intermediate member is shifted in opposite directions from a predetermined position corresponding to a condition value to be maintained, and a single voltage regulator driven from said intermediate member and operable to shift the control point of said instrument in opposite directions with opposite changes in the position of said driven member and to reduce the control point shift in response to the operation of said second operator.

15. A control system having, in combination, a reversible electric motor operator having a driven member, an instrument controlling said operator to cause opposite movements of said member in response to opposite deviations of a controlled condition from the instrument control point, a second reversible electric operator having an element driven at a slower speed than said member, a device driven differentially by said driven member and element, means controlling said second operator to cause movements of said driven element in opposite directions in response to movements of said device in opposite directions from a predetermined position, and voltage regulating means actuated by said device and operable to shift the control point of said instrument in opposite directions with opposite changes in the position of said device.

16. A control system having, in combination, a reversible electric motor operator having a driven member, an instrument controlling said operator to cause opposite movements of said member in response to opposite deviations of a controlled condition from the instrument control point, a second reversible electric operator having an element driven at a slower speed than said member, a device driven differentially by said member and element, means controlling said second operator to cause movements of said driven element in opposite directions when said device is shifted in opposite directions from a predetermined position corresponding to a condition value to be maintained, and means operable automatically to shift the control point of said instrument progressively in opposite directions with opposite changes in the position of said device.

17. A control system having, in combination, a reversible electric motor operator having a driven member, means for detecting deviations of a controlled condition from a desired value, mechanism controlled by said means and controlling said operator to actuate said member first with a primary movement proportional and in a direction corresponding to the condition deviations and then with a slower secondary resetting movement, said mechanism including a second operator driven by reversible electric motor driving means adapted when energized to exert a constant torque for causing said secondary movement, and automatically controlled means operating to vary the speed of said driving means while maintaining said motor torque constant.

18. A control system having, in combination, a reversible power actuator having a driven member, an instrument controlling said operator in response to changes of a condition, a second reversible power operator having an element driven at a slower speed than said member, a device moved mechanically and differentially by both said member and element, said second operator being rendered active as an incident to a deviation of said condition from a predetermined value, and means actuated by said device and coacting with said instrument to cause said first operator to modulate the position of said member first with a primary movement proportional to the condition deviation and then with a slower secondary resetting movement.

19. A control system having, in combination, a reversible power actuator having a driven member, an instrument controlling said operator in response to changes of a condition, a second reversible power operator having an element driven at a slower speed than said member, a device moved mechanically and differentially by both said member and element, said second operator being rendered active as an incident to a deviation of said condition from a predetermined value, means actuated by said device and coating with said instrument to cause said first operator to modulate the position of said member first with a primary movement proportional to the condition deviation and then with a slower secondary resetting movement, and means actuated mechanically by said device and operable to vary the speed of operation of said element by said second operator in accordance with the extent of deviation of said condition from said predetermined value.

20. A control system having, in combination, a reversible power actuator having a driven member, an instrument controlling said operator in response to changes of a condition, a second reversible power operator having a device driven at a slower speed than said member, a differential mechanism having input elements actuated by said member and device and an output element, said second operator being rendered active as an incident to a deviation of said condition from a predetermined value, and means actuated by said output element and coacting with said instrument to cause said first operator to modulate the position of said member first with a primary movement proportional to the condition deviation and then with a slower secondary resetting movement.

EDGAR D. LILJA.